United States Patent Office 3,791,945
Patented Feb. 12, 1974

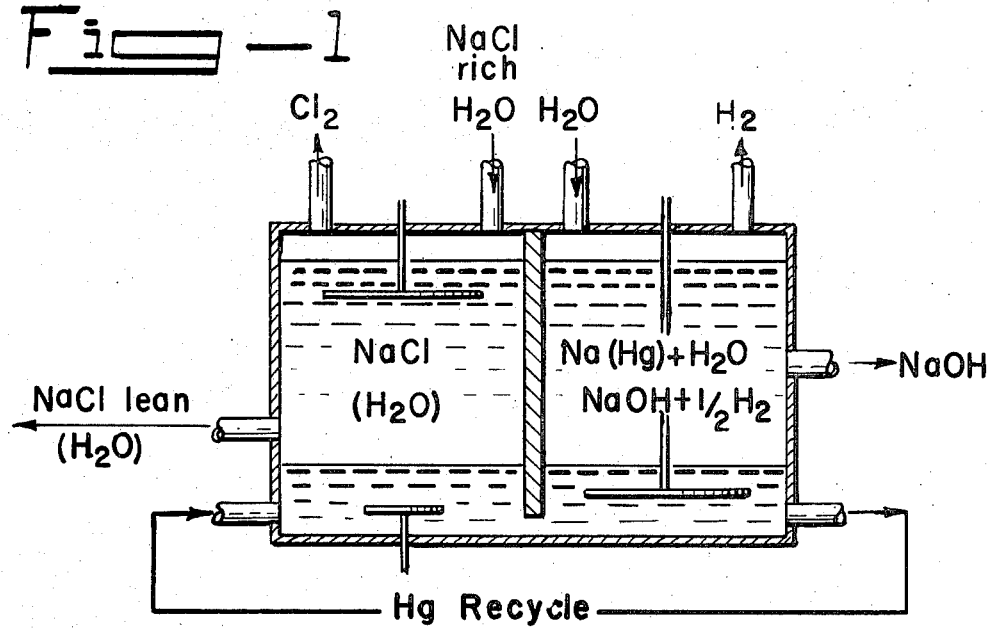
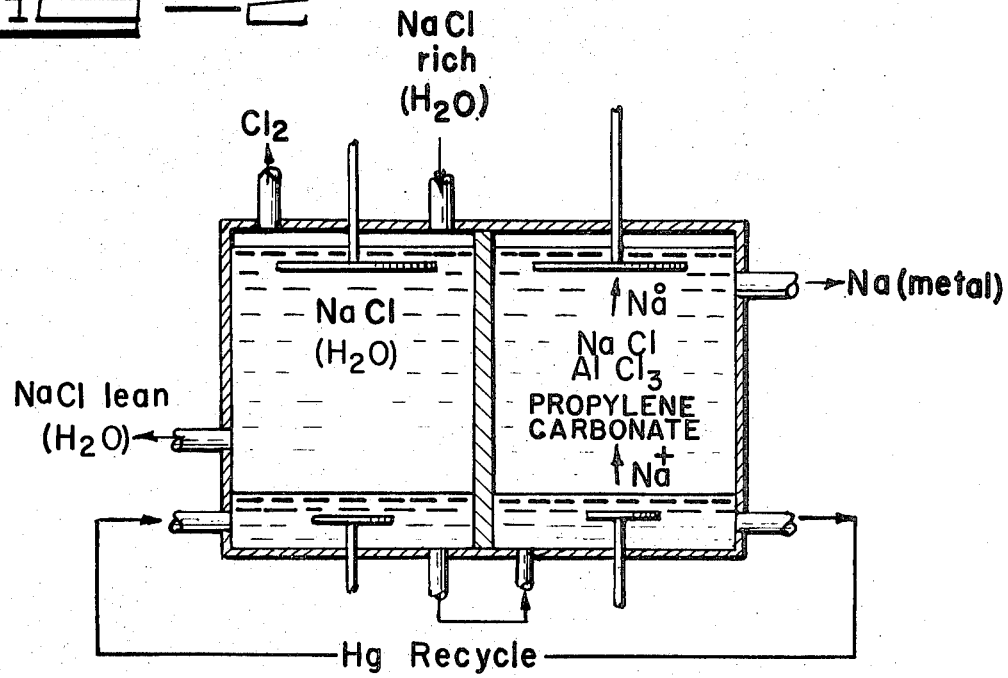

---

3,791,945
METHOD OF PRODUCTION OF ALKALI METALS AND THEIR ALLOYS
Charles W. Tobias, Orinda, Calif., and Jacob Jorne, Southfield, Mich., assignors to the United States of America as represented by the United States Atomic Energy Commission
Filed Feb. 22, 1973, Ser. No. 334,825
Int. Cl. C22d 1/02, 1/06
U.S. Cl. 204—59 AM                          10 Claims

ABSTRACT OF THE DISCLOSURE

An impure amalgam of an alkali metal or mixture thereof is produced by electrolysis. The amalgam is then transferred to an electrolytic cell containing propylene carbonate with an appropriate salt (or salts) of the alkali metal (or metals), e.g. of $ClO_4^-$, $BF_4^-$, $PF_6^-$, $Cl^-$, $Br^-$, $I^-$, with or without added $AlCl_3$. Then, with appropriate voltage, current and other conditions, one or more selected alkali metals is anodically dissolved to yield a pure metal or selected metal mixture by electrodeposition.

ORIGIN

This invention was made in the course of, or under Contract W-7408-ENG-48 between the United States Atomic Energy Commission and the University of California.

BACKGROUND OF THE INVENTION

This invention relates to an improved electrolytic process for recovery of an alkali metal from its amalgam. More particularly the present invention relates to a low-temperature electrolytic process for the recovery of lithium, sodium, potassium, rubidium, cesium and mixtures thereof from their amalgams.

The amalgam is prepared using conventional mercury-chlorine cells well known in the art for producing sodium and potassium amalgams by electrolyzing aqueous solutions of the chlorides of these alkali metals. This method of producing amalgams is described for instance in Gmelins Handbuch der Anorganischen Chemie, 8 Auflage, Verlag Chemie, GMBH, Mercury, System No. 34, Teil A, Lieferung 2, 1962 (pp. 915–956, 986–100). Properties and methods of preparation of the amalgams of lithium, rubidium and cesium are also well known (see the above reference at pp. 899–911, 1010–18, 1023–1027). The method used for the commercial production of sodium and potassium amalgams can be adapted without major changes to the preparation of lithium, rubidium or cesium amalgams as well. Amalgams of any of the alkali metals can also be prepared by direct dissolution of the metal in mercury; a technique suitable for purifying impure alkali metals.

For obtaining the pure alkali metal, the amalgam must be separated into its components: the alkali metal and mercury. Among the various procedures proposed to accomplish this separation, distillation, medium temperature electrolysis (refining) using molten alkali metal salt mixtures, and low-temperature electrolysis using inorganic or organic solvent media, deserve mention. These methods are described for lithium amalgam in Gmelins Handbuch der Anorganischen Chemie, 8 Auflage, Verlag Chemie, GMBH, Lithium, Erganzungsbans, System No. 20, 1960 (pp. 1236 and 207) for sodium amalgam in Gmelins Handbuch der Anorganischen Chemie, 8 Auflage, Verlag Chemie, GMBH, Sodium, Eerganzungsband, Lieferung 1, System No. 21, 1964 (pp. 8–14, 49–75) and for potassium amalgam in Gmelins Handbuch der Anorganischen Chemie, 8 Auflage, Verlag Chemie, GMBH, Potassium, System No. 22, 1938 (pp. 69–71, 207–209). Various methods for the preparation of rubidium and cesium metals are briefly summarized in Gmelins Handbuch der Anorganischen Chemie, 8 Auflage, Verlag Chemie, GMBH, Rubidium, System No. 26, 1932 (pp. 23–25) and Gmelins Handbuch der Anorganischen Chemie, 8 Auflage, Verlag Chemie, GMBH, Cesium, System No. 27, 1938 (pp. 14–16). The above references were arbitrarily selected from numerous existing works on the subject of alkali metal production.

Separation of the pure alkali metal from its amalgam by distillation, is economically unattractive. The electrolytic purification methods (refining) proposed thus far suffer from various deficiencies. Processes employing molten salts involve elevated temperatures at which the vapor pressure of mercury is sufficiently high to cause it to transfer into the product alkali metal as an undesirable impurity. Other nonaqueous electrolytes involving inorganic, or organic solvents considered for ambient temperature refining processes of alkali metals have so far not met one or several of the following primary criteria: stability with respect to the alkali metal, good solvent power for alkali metal salts or complexes, sufficient level of conduction, low melting point, low cost, low toxicity. A technologically feasible, and economically attractive electrolytic refining process for the recovery of pure alkali metals from their amalgams demands a solvent system, which possesses many of the favorable qualities of water, but one in which alkali metals are stable.

The carbonate-ester family of solvents, including propylene carbonate, were reported as suitable solvents for electrolysis in electrochemical studies in cyclic esters by W. S. Harris, Report UCRL-8381. We have made this invention as a result of work on the behavior of alkali metal/alkali metal ion couples, and of their amalgams, which has been documented in Lawrence-Berkeley Report LBL-1111, dated September 1972.

SUMMARY OF THE INVENTION

It is an object of this invention to provide an electrolytic process for the recovery of an alkali metal from its amalgam thereby producing an alkali metal of enhanced purity.

In accordance with this invention, an electrolytic process is provided for the separation of alkali metals by anodic dissolution of the alkali metal from its amalgam into propylene carbonate or related solvent, such as $\gamma$-butyrolactone accompanied by simultaneous deposition of the metal in pure form.

In practicing this invention alkali metals first are amalgamated with mercury by electrolysis from water solutions of the salts. This may be performed in a conventional amalgam cell used for production of chlorine from alkali metal chlorides. The amalgam is transferred into a cell containing propylene carbonate electrolyte and an appropriate salt or salt combination. Among the salts employed best results were obtaned from $Cl^-$, $Br^-$, $I^-$, $ClO_4^-$, $BF_4^-$, $PF_6^-$, with or without the addition of $AlCl_3$. The system undergoes electrolysis and the alkali metal then is deposited in pure form from the amalgam in a manner similar to electrorefining.

The process set forth can also be employed to produce alloys of the alkali metals. This may be accomplished by carrying out the reaction with an amalgam containing two or more alkali metals and a selected electrolyte composition in such a manner that two or more alkali metals co-deposit. This technique is for instance suitable for the production of Na-K alloys.

DETAILED DESCRIPTION OF THE INVENTION

A schematic diagram of the proposed process is shown in the drawings. FIG. 1 is a schematic representation of the well-known mercury-chlorine cell where, as an example, chlorine and sodium hydroxide are the two main products. FIG. 2 represents the modified process. The first stage is identical to the first stage of FIG. 1, however, the second stage is a non-aqueous propylene carbonate cell. The main products of the modified process are therefore chlorine (as before) and metallic sodium (instead of aqueous NaOH solution).

In the system depicted the lean amalgam is continuously recycled to the aqueous cell where it picks up by cathodic deposition fresh alakli metal. Unlike in the cell configuration illustrated in FIG. 1, the second stage (refining cell) will be typically not contiguous with the first stage (amalgam-chlorine cell), to allow greater flexibility in mechanical design and operation. Each cell is to provide for the proper flow of amalgam, which is to form a planar cathode surface in stage I, and an anode in stage II. Before transfer of the amalgam from stage I to II, appropriate measures have to be taken for eliminating any entrainment of the aqueous phase into stage II. Similarly, provisions have to be made to prevent entrainment of the organic phase upon recirculation of the lean amalgam from stage II to stage I.

In the new cell, stage II, the alkali metal is dissolved anodically from the amalgam stream entering from stage I, and the pure alkali metal is simultaneously deposited in equivalent amount on the cathode, a sheet or screen fabricated from a low cost alloy having suitable mechanical properties. As the amalgam passes through stage II, its alkali metal content gradually diminishes; this decrease in concentration being determined by the rate at which the amalgam passes through, and by the current applied through the cell. The product alkali metal may be removed periodically by changing the cathode, or continuously, by moving belt cathode surface. When the product metal is obtained in the liquid state (such as potassium above 62.3° C.), by virtue of its low density (0.83 g./cm.$^3$) it rises to the electrolyte surface, where it can be skimmed off periodically, or collected continuously by a suitable overflow arrangement. In the case of the heavier alkali metals, Rb and Cs, which are obtained in the liquid state already at 38.5° and 28.5° C., respectively, the product metal would tend to sink onto the amalgam surface. However, collection of the product metal in these cases can be achieved by a suitably designed cathode.

The electrolyte consists of an alkali metal salt, such as perchlorate, borofluoride, hexafluorophosphate, chloride, bromide, iodide, with or without AlCl$_3$, in propylene carbonate solvent. If AlCl$_3$ is added, the concentration of alkali metal salt should be about the same as AlCl$_3$. AlCl$_3$ addition is particularly advantageous in the case of alkali halides. By forming acid-base complexes the solubility of the alkali salt is strongly enhanced. The presence of higher ionic concentration levels improve the conductance, and allow adequate transport rates for the deposition of the alkali metal at practical current densities.

The concentration of these salts should be sufficiently large to permit deposition of the alkali metals at practical rates. While there is a considerable latitude in selecting the concentration range for operating a successful process, the concentration of alkali metal salts, and that of AlCl$_3$ will be in the range of 0.5–2 molar (moles per liter of solution), the molal ratio of alkali halide to that of AlCl$_3$ in the bulk solution being in the range of 0.1–1.0. The current densities can be varied as in other electrolytic processes over a large range; it is proposed that this process can be carried out best in the range of 10–100 ma./cm.$^2$.

Standard potential of the alkali metal-metal ion electrodes in 1 m AlCl$_3$ containing propylene carbonate electrolyte were obtained to support the claim of feasibility of this new process. The order of standard potentials is different from that in aqueous media. The order of increasing standard potential is:

$$Cs > Rb > K > Li > Na$$

The actual deposition and dissolution potentials applicable to an individual alkali metal as well as to its amalgam is determined by its reversible (thermodynamic) potential and the overpotential required for the anodic or cathodic reaction to proceed at a predetermined rate (current density). In the MCl-1 m AlCl$_3$-PC electrolyte cell systems it has been found that the overpotential as related to the charge transfer reaction is lowest for lithium, and highest for potassium.

The new cell, stage II, can be operated at ambient temperature, although elevated temperature lowers cell potential because of improved conductance, and lower reversible and overpotentials. However, increased reactivity of the product metal with the electrolyte requires temperatures to be kept below approximately 100° C.

EXAMPLE 1

A potassium amalgam solution containing 0.22 weight percentage of potassium, taken from the cathode section of a conventional mercury-chlorine cell is introduced into the anodic part of an electrolytic cell of a design corresponding to that shown in stage II of FIG. 2. The electrolyte in the cell is composed of pure propylene carbonate, to which is added both AlCl$_3$ and KCl in the amount of 1 gram molecular weight each per 1000 grams of propylene carbonate. A steel screen serves as the cathode. Liquid droplets of the potassium rise to the electrolyte surface, from where the product potassium metal is withdrawn by skimming, or overflow. The gap between the steel screen and the cathode is 1 cm.

The cell is operated at 65° C., slightly above the melting point of potassium. Mercury flows across the bottom of the cell in turbulent flow, and the screen is attached to a vibrator to assure good convective ionic transport to the cathode. Current density is 0.05 a./cm.$^2$ The amalgam flow through the cell is so regulated that the effluent stream contains not less than 0.02 weight percent (corresponding to 0.01 mol percent) potassium.

The cell voltage is about 5.0 volts. Hence the power required per pound of potassium, assuming 100% current efficiency, is:

$$\text{Power/lb. } K = (5.0 \text{ volts})(26.8 \text{ ah./g. mole})(453.6 \text{ g./lb.}) \left(\frac{1 \text{ g. mole}}{39.1 \text{ g}}\right)$$

$$= 1{,}554.5 \text{ watt-hours/lb.} = 1.55 \text{ kwh./lb.}$$

potassium

What is claimed is:

1. A process for the recovery of alkali metal or mixtures thereof from a flowing mercury amalgam thereof comprising passing an electrolysis current between an anode and a cathode through an electrolyte of propylene carbonate and alkali metal salts, wherein the salt is selected from the group of compounds wherein the negative ion is ClO$_4^-$, BF$_4^-$, or PF$_6^-$, AlCl$_4^-$, Cl$^-$, Br$^-$, I$^-$, said anode containing the mercury amalgams, to remove the alkali metals from the anode and deposit the same at the cathode without reaction of the mercury.

2. The process of claim 1 wherein the electrolyte also contains excess AlCl$_3$.

3. The process of claim 1 wherein the alkali metal recovered is lithium.

4. The process of claim 1 wherein the alkali metal recovered is sodium.

5. The process of claim 1 wherein the alkali metal recovered is potassium.

6. The process of claim 1 wherein the alkali metal recovered is rubidium.

7. The process of claim 1 wherein the alkali metal recovered is cesium.

8. The process of claim 1 wherein more than one alkali metal is recovered.

9. The process of claim 8 in which the composition of deposited metal phase is different than the relative percentage distribution of the alkali metals in the amalgam.

10. The process of claim 8 in which the composition of deposited metal phase is different than the relative percentage distribution of the alkali metals in the electrolyte.

References Cited
UNITED STATES PATENTS

| | | | |
|---|---|---|---|
| 1,538,390 | 5/1925 | Ewan | 204—59 AM |
| 2,313,408 | 3/1943 | Vingee et al. | 204—59 AM |
| 3,493,433 | 2/1970 | Hoffman | 204—59 AM |
| 3,616,280 | 10/1971 | Arnold | 204—14 N |

FREDERICK C. EDMUNDSON, Primary Examiner